V. E. VAN CANTFORT.
VEHICLE WHEEL.
APPLICATION FILED JULY 19, 1907. RENEWED AUG. 24, 1909.
936,587.
Patented Oct. 12, 1909.
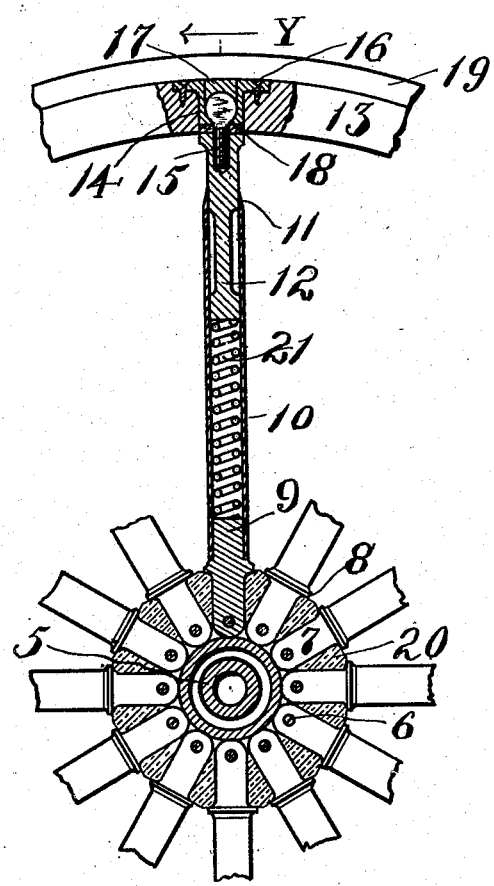
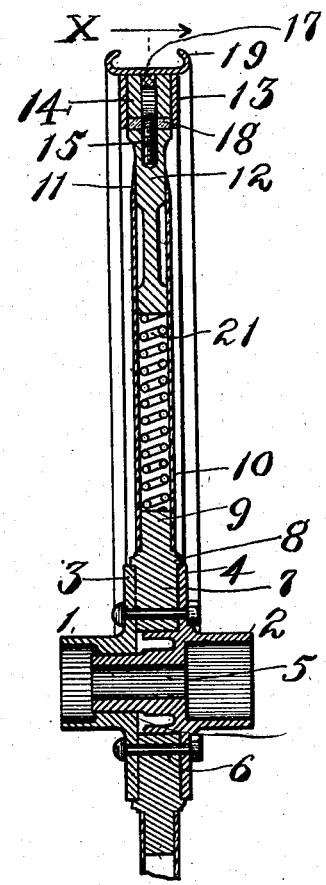
Fig. 1.
Fig. 2.
Witnesses:
A. E. King
Glenara Fox
Inventor
Victor Eugene Van Cantfort
by C. E. Humphrey
Atty.

UNITED STATES PATENT OFFICE.

VICTOR EUGENE VAN CANTFORT, OF AKRON, OHIO.

VEHICLE-WHEEL.

936,587.  Specification of Letters Patent.  Patented Oct. 12, 1909.

Application filed July 19, 1907, Serial No. 384,519.  Renewed August 24, 1909.  Serial No. 514,453.

*To all whom it may concern:*

Be it known that I, VICTOR EUGENE VAN CANTFORT, a citizen of the United States, residing at Akron, in the county of Summit and State of Ohio, have invented new and useful Improvements in Vehicle-Wheels, of which the following is a specification.

This invention relates to vehicle wheels, and the object thereof is to provide a vehicle wheel having extensible spokes, said spokes comprising coiled resilient elements as one of the component parts thereof, said coiled resilient elements arranged to be compressed by a load carried by the vehicle in which said spokes are employed when said spokes are below the plane of the hub of the wheel.

A further object of this invention is to provide a wheel having as one of its component parts spokes having coiled resilient elements operative when below the plane of the hub and inoperative when above with means for yieldingly attaching the spokes to the hub and felly, said means supporting the resilient elements and protecting the entire mechanism against the injurious effects of foreign substances such as water, dirt, etc., all of which will be more fully described in the subjoined specification.

A practical embodiment of my invention is illustrated in the accompanying drawings, in which similar reference numerals indicate like parts in the different figures.

In the drawings, Figure 1 is a central longitudinal section through one of the spokes on line X of Fig. 2, showing the hub and felly portion of the wheel and the manner of uniting one spoke to both of these elements; and, Fig. 2 is a section on line Y of Fig. 1 and on a plane parallel to the axle on which the wheel is adapted to be mounted.

The hub of the felly is constructed of two members, referred to in the drawings by the reference numerals 1 and 2, each provided with radial integral flanges, numbered 3 and 4. The member 2 is provided with an elongated sleeve 5 of a proper bore to fit on the axle of the vehicle, and the member 1 is interiorly bored to be slidably supported on the exterior of the sleeve 5. The two members 1 and 2 are united by means of a plurality of transverse bolts 6 which serve to draw the two flanges 3 and 4 toward each other and maintain them fixedly in position against either circumferential or lateral movement. Each of the spokes used with this device consists of an inner head 7 provided with a perforation to receive one of the bolts 6, thereby pivoting the entire spoke on said bolt. These heads 7 are adapted to extend outwardly from between the two flanges 3 and 4 and are provided with an annular ridge 8 constituting a shoulder from which extends a cylindrical portion 9. The body of the spoke consists of a tube 10 adapted to inclose the cylindrical portion 9 and abut against the shoulder 8, and it is further provided with a beveled outer end 11. Mounted in the outer end of the tube 10 is a slidable plunger 12 extending approximately to the inner edge of the felly 13, and between the plunger 12 of the cylindrical portion 9 is interposed a coiled spring 21, the normal tendency of which is to force the plunger 12 outwardly.

Embedded in suitable openings in the felly are a plurality of socket-forming members 14, each provided with a contracted inner opening in which is mounted a headed pin 15 provided with a threaded shank arranged to enter and engage in an interiorly-threaded opening in the end of the plunger 12, thereby connecting each socket-forming member to one of the plungers 12. The socket-forming member is preferably retained in position by means of screws 16 engaging in the material of which the felly is composed. The outer portion of the opening in the socket-forming member 14 which is not occupied by the head of the pin 15, is preferably filled by a cup-shaped member 17. Positioned between the inner end of the member 14 and the outer end of the plunger 12 is a rubber washer 18 in order to make the joint between the felly and spoke yieldable. On the outer face of the felly 13 is mounted a rim 19, of any preferred construction, the one shown in the drawings being of the ordinary clencher type. The spaces between the heads 7 of the inner ends of the spokes and the flanges 3 and 4 are preferably filled by blocks of rubber 20, both to cushion the joint between the inner ends of the spokes and hub and also to prevent the entrance therein of dirt, sand and other foreign matters.

In setting up a vehicle wheel such as is shown in the drawings, it will be stated that all spokes are constructed precisely alike and the felly may be made in one piece or in a plurality of segments, as desired, without in any manner departing from the scope of this invention; the resilient or elastic cushioning of the vehicle sought in employing a wheel of this construction is attained by the use of the elastic member 21 contained within the tubular spoke body 10, and at the same time the spoke body 10 serves to maintain the elastic member from distortion and keep the same radially in position. By pivoting the inner ends of the spokes on the bolts 6, a slight movement is permitted sufficient to prevent the injury of the wheel, and at the same time the headed pin 15 engaging in the socket-forming member 14 constitutes a pivotal joint between the outer end of the spoke and the felly.

From the foregoing it will be seen that a wheel set up in accordance with this invention possesses an unusually high degree of elasticity, and at the same time the parts are all substantially protected against the entrance of foreign matter and the wheel may be readily dismounted for repairs or shipment.

Having thus described my invention, what I claim and desire to secure by Letters Patent, is:—

1. A vehicle wheel comprising a hub consisting of a sleeve having an opening to receive the vehicle axle and provided with a radial flange, a complementary hub member mounted on said sleeve similarly provided with a radial flange, a bolt connecting said flanges, a spoke head apertured to receive said bolt pivotally mounted thereon, said head provided with a shoulder, a tubular member inclosing said head abutting against said shoulder, a coiled resilient element positioned within said tubular member, a plunger provided with a threaded longitudinally-extending opening in one end slidably mounted in said tubular member, a threaded element mounted in said opening, said element provided with a circular head, a felly provided with an opening and a socket-forming member positioned within said opening provided with a recess adapted to receive the head of said threaded element.

2. A vehicle wheel comprising a hub consisting of a sleeve having an opening to receive the vehicle axle and provided with a radial flange, a complementary hub member mounted on said sleeve similarly provided with a radial flange, a bolt connecting said flanges, a spoke head apertured to receive said bolt pivotally mounted thereon, said head provided with a shoulder, a tubular member inclosing said head abutting against said shoulder, a coiled resilient element positioned within said tubular member, a plunger provided with a threaded opening in one end slidably mounted in said tubular member, a threaded element mounted in said opening, said element provided with a circular head, a felly provided with an opening, a socket-forming member positioned within said opening provided with a recess adapted to receive the head of said threaded element and an elastic washer positioned between the end of said plunger and the inner face of said socket-forming member.

3. A vehicle wheel comprising a hub consisting of a sleeve having an opening to receive the vehicle axle and provided with a radial flange, a complementary hub member mounted on said sleeve similarly provided with a radial flange, a bolt connecting said flanges, a spoke head apertured to receive said bolt pivotally mounted thereon, said head provided with a shoulder, a tubular member inclosing said head abutting against said shoulder, a coiled resilient element positioned within said tubular member, a plunger provided with a threaded opening in one end slidably mounted in said tubular member, a threaded element mounted in said opening, said element provided with a circular head, a felly provided with an opening, a socket-forming member positioned within said opening provided with a recess of greater dimensions than the head of said threaded element, adapted to receive the same, a member having a cup-shaped inner end adapted to fill the cavity in said recess not occupied by the circular head of said threaded element and a rim mounted on said felly engaging said cup-shaped member for retaining the latter in position in said recess.

4. A vehicle wheel comprising a hub consisting of a sleeve having an opening to receive the vehicle axle and provided with a radial flange, a complementary hub member mounted on said sleeve similarly provided with a radial flange, a bolt connecting said flanges, a spoke head apertured to receive said bolt pivotally mounted thereon, said head provided with a shoulder, a tubular member inclosing said head abutting against said shoulder, a coiled resilient element positioned within said tubular member, a plunger provided with a threaded opening in one end slidably provided in said tubular member, a threaded element mounted in said opening, said element provided with a circular head, a felly provided with an opening, a socket-forming member positioned within said opening provided with a recess of greater dimensions than the head of said threaded element, adapted to receive the same, a member having a cup-shaped inner end adapted to fill the cavity in said recess not occupied by the circular head of said threaded element, a rim mounted on said felly engaging said cup-shaped member for retaining the latter in position in said recess and an elastic washer positioned between the ends of said plunger and the inner face of said socket-forming member.

5. A vehicle wheel comprising a hub consisting of a sleeve having an opening to receive the vehicle axle and provided with a radial flange, a complementary hub member mounted on said sleeve similarly provided with a radial flange, a plurality of bolts connecting said flanges, a plurality of spoke heads each apertured to receive said bolts and pivotally mounted thereon, said spoke heads each provided with a shoulder, a plurality of rubber bodies each of which is adapted to be interposed between adjacent spoke heads and arranged to be held against outward movement by the shoulders thereof and from lateral movement by said flanges, tubular members each inclosing one of said spoke heads and abutting against the shoulder thereof, coiled resilient elements each positioned in one of said tubular members, plungers each provided with a threaded longitudinally-extending opening in the outer end thereof slidably mounted in a respective tubular member, threaded elements each mounted in one of said longitudinally-extending openings, each of said elements provided with a circular head, a felly provided with a plurality of openings, and a socket-forming member positioned in each of said openings, said socket-forming members each provided with a recess adapted to receive the head of one of said threaded elements.

In testimony whereof I have hereunto set my hand in presence of two subscribing witnesses.

VICTOR EUGENE VAN CANTFORT.

Witnesses:
GLENARA FOX,
E. C. HUMPHREY.